(12) United States Patent
Kim et al.

(10) Patent No.: US 7,386,220 B2
(45) Date of Patent: Jun. 10, 2008

(54) APPARATUS AND METHOD FOR CONTROLLING RECORDING OPERATION FOR VIDEO CASSETTE RECORDER HAVING DIGITAL TUNER

(75) Inventors: Min Chul Kim, Seoul (KR); SeungSoo Park, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 830 days.

(21) Appl. No.: 10/929,504

(22) Filed: Aug. 31, 2004

(65) Prior Publication Data

US 2005/0091687 A1 Apr. 28, 2005

(30) Foreign Application Priority Data

Oct. 22, 2003 (KR) .................. 10-2003-0073599

(51) Int. Cl.
*H04N 5/91* (2006.01)
*H04N 7/00* (2006.01)

(52) U.S. Cl. .......................... 386/83; 386/46

(58) Field of Classification Search ................. 386/83, 386/46, 124, 52, 1; 725/39, 40, 55
See application file for complete search history.

(56) References Cited

U.S. PATENT DOCUMENTS

2005/0152678 A1* 7/2005 Sugai et al. .................. 386/83
2005/0220440 A1* 10/2005 Liebhold ..................... 386/68

* cited by examiner

*Primary Examiner*—Bob Chevalier
(74) *Attorney, Agent, or Firm*—Bacon & Thomas, PLLC

(57) ABSTRACT

An apparatus and a method for controlling a recording operation for a video cassette recorder system having a digital tuner, prevent broadcast signals from being combined with menu screen data when a GUI is activated in the course of a watching and a recording operations. The apparatus and the method check whether the GUI is activated, and then performs an automatic switching operation so as to record the broadcast signals before menu screen data generated from the GUI are combined with the broadcast signals if the GUI is activated. Therefore, the apparatus and the method basically prevents the menu screen data from being combined with the broadcast signals.

4 Claims, 2 Drawing Sheets

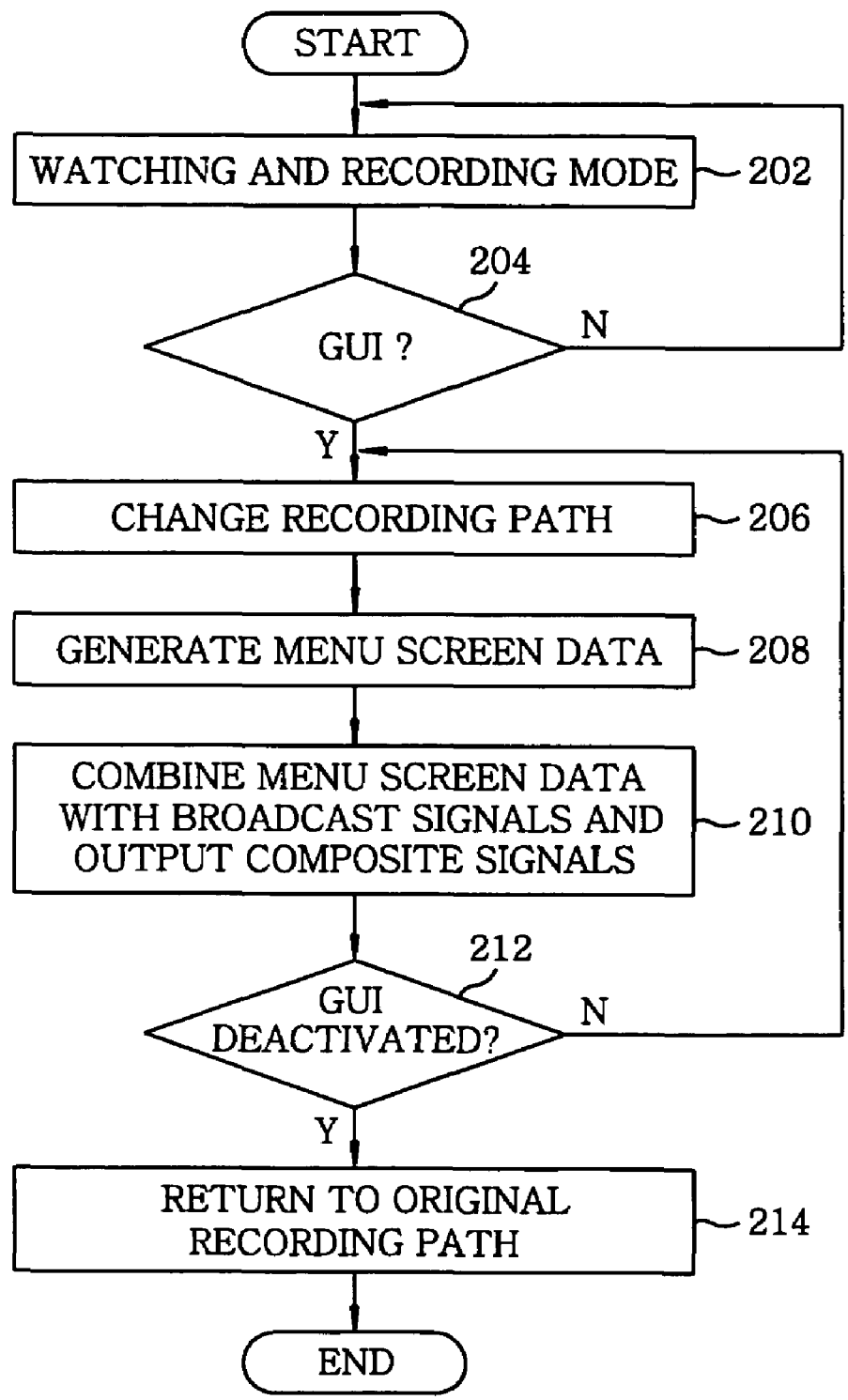

APPARATUS AND METHOD FOR CONTROLLING RECORDING OPERATION FOR VIDEO CASSETTE RECORDER HAVING DIGITAL TUNER

FIELD OF THE INVENTION

The present invention relates to a video cassette recorder system; and more particularly, to an apparatus and a method for controlling a recording operation for a video cassette recorder system having a digital tuner that receives broadcast signals transmitted through a cable.

BACKGROUND OF THE INVENTION

As well known to those skilled in the art, a Video Cassette Recorder (VCR) is an appliance used to record broadcast signals (that is, programs) on videotapes, or play programs recorded on videotapes. Such a VCR has been widely propagated to such an extent that almost all houses are provided with VCRs.

Recently, a cable broadcasting using different frequency bands from those of a terrestrial broadcasting has spread rapidly in addition to a development of the terrestrial broadcasting. However, there is a problem in that either a set-top box having therein a tuner for the cable broadcasting or an exterior-type cable tuner should be required separately so as to receive broadcast signals.

In order to solve the problem, a VCR system having a digital tuner therein has been proposed, which provides a function of allowing a user to record a specific cable broadcasting program on a videotape while watching any broadcasting program depending on the user's selection.

In this case, users can be provided with various menu screens through a Graphical User Interface (GUI) while simultaneously watching and recording a cable broadcasting program. Such menu screens, e.g., broadcasting program guide menu screens, provide convenience to users, but there is a problem in that menu screen data representing the menu screens are also recorded together with a cable broadcasting program on a videotape.

That is, these menu screen data are inevitably recorded on the videotape together with broadcast signals even though the users do not want the menu screens to be displayed. Therefore, when a broadcasting program recorded on the videotape is replayed, the menu screens are also displayed undesirably.

SUMMARY OF THE INVENTION

It is, therefore, an object of the present invention to provide an apparatus and a method for controlling a recording operation for a VCR having a digital tuner, which prevent menu screen data from being combined with broadcast signals, i.e., from being recorded, at the time when a graphical user interface (that is, a menu screen) is activated in the course of watching and recording a cable broadcasting program simultaneously.

In accordance with one aspect of the present invention, there is provided an apparatus for controlling a recording operation included in a Video Cassette Recorder (VCR), wherein a watching operation is executed through a monitor, and at the same time, the recording operation is executed through a recording unit with respect to a cable broadcasting program, including: control means for checking whether a Graphical User Interface (GUI) is activated, and then generating a first and a second switching control signals when the GUI is activated, and generating a third and a fourth switching control signals when a GUI is not activated; combining means for combining menu screen data generated from the GUI with broadcast signals of the cable broadcasting program to thereby generate composite signals when the GUI is activated, while transmitting the broadcast signals when the GUI is not activated; first switching means for transmitting the broadcast signals to the combining means for the purpose of the watching operation, and at the same time, to the recording unit for the purpose of the recording operation, in response to the first switching control signal when the GUI is activated, while transmitting the broadcast signals to the combining means for the purpose of the recording and the watching operations in response to the third switching control signal when the GUI is not activated; and second switching means for transmitting the composite signals received from the combining means to the monitor for the purpose of the watching operation in response to the second switching control signal when the GUI is activated, while transmitting the broadcast signals to both the recording unit for the purpose of the recording operation and to the monitor for the purpose of the watching operation in response to the fourth switching control signal when the GUI is not activated.

Further, in accordance with another aspect of the present invention, there is provided a method for controlling a recording operation included in a Video Cassette Recorder (VCR), wherein a watching operation is executed through a monitor, and at the same time, the recording operation is executed through a recording unit with respect to a cable broadcasting program, including the steps of: checking whether a Graphical User Interface (GUI) is activated; and displaying broadcast signals of the cable broadcasting program through the monitor and at the same time transmitting the broadcast signals to the recording unit so as to record the broadcast signal when the GUI is not activated, while transmitting the broadcast signals to the recording unit before the GUI is combined with the broadcast signals, and displaying composite signals, which is the combination of the GUI and the broadcast signals, on the monitor after the GUI is combined with the broadcast signals when the GUI is activated.

BRIEF DESCRIPTION OF THE DRAWING

The above and other objects and features of the present invention will become apparent from the following description of a preferred embodiment given in conjunction with the accompanying drawings, in which:

FIG. 2 illustrates a flowchart of a process of recording a broadcasting program in accordance with the present invention.

DETAILED DESCRIPTION OF THE PREFERRED EMBODIMENTS

Figure 1:
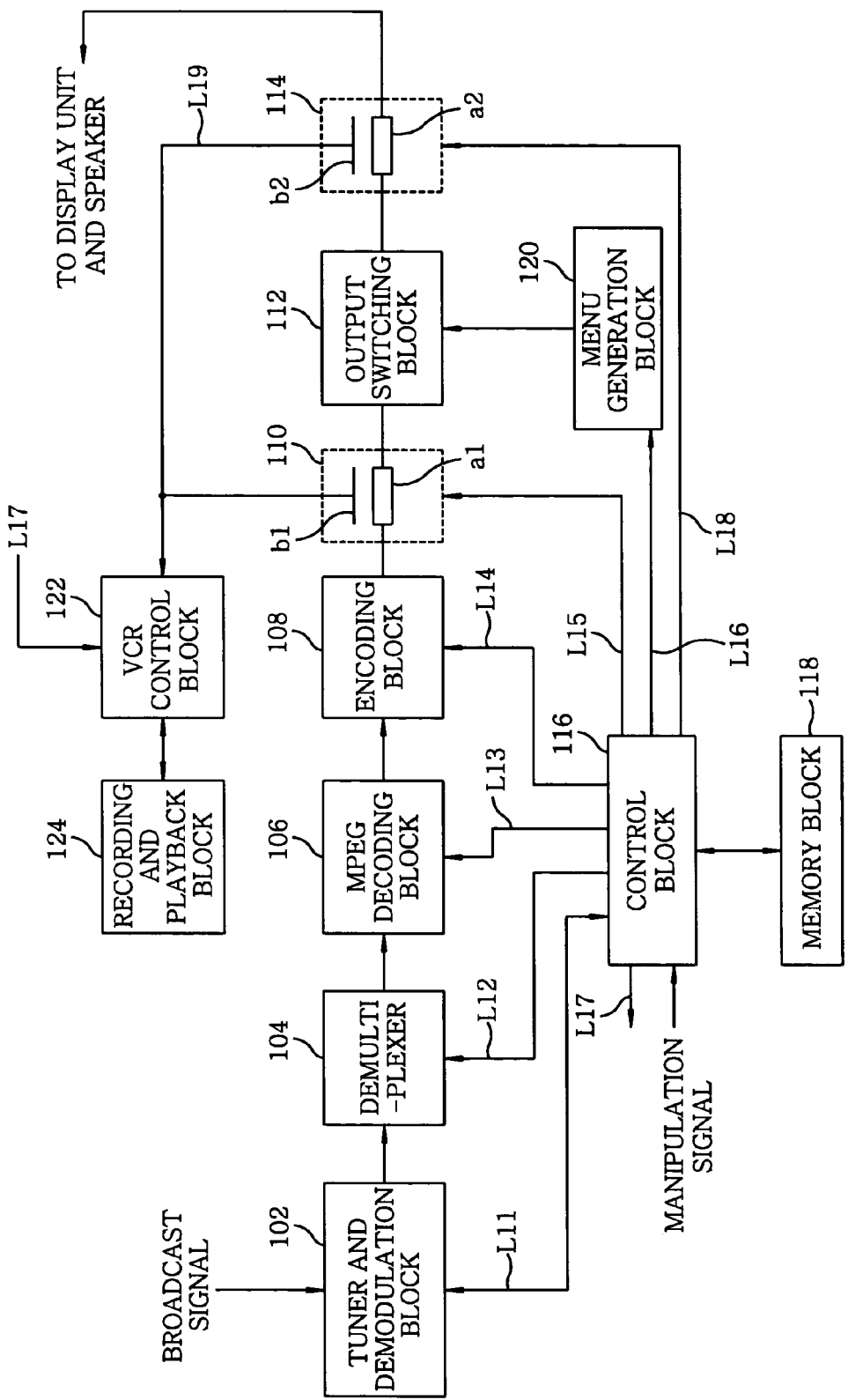
FIG. 1 illustrates a block diagram of a VCR system having an apparatus for controlling a recording operation thereof in accordance with the present invention.

A preferred embodiment of the present invention will now be described in detail with reference to the accompanying drawings.

Unlike a conventional scheme, i.e., combining menu screen data generated from a GUI with broadcast signals to be recorded and then recording both the menu screen data and the broadcast signals in the course of watching and recording cable broadcasting program simultaneously, the present invention performs an automatic switching operation so as to record the broadcast signals before the menu screen data are combined with the broadcast signals when a GUI is activated in the course of watching and recording the cable broadcasting program simultaneously. Therefore, the present invention basically prevents the menu screen data from being combined with the broadcast signals.

FIG. 1 illustrates a block diagram of a VCR system having an apparatus for controlling a recording operation in accordance with a preferred embodiment of the present invention. The VCR system includes a tuner and demodulation block 102, a demultiplexer 104, a Moving Picture Experts Group (MPEG) decoding block 106, an encoding block 108, a first switching unit 110, an output switching block 112, a second switching unit 114, a control block 116, a memory block 118, a menu generation block 120, a VCR control block 122, and a recording and playback block 124.

Referring to FIG. 1, the tuner and demodulation block 102 extracts additional information (that is, channel information packet data, program information packet data, etc.) from data streams received through a cable (not shown) In detail, the tuner and demodulation block 102 extracts (1) channel information packet data that includes Program Allocation Table (PAT) information composed of N-bit Program Identifier (PID) information indicating the program numbers for each broadcast channel, and (2) program information packet data that includes Program Map Table (PMT) information composed of N-bit PID information indicating audio, video and text of a specific channel, N-bit detailed PID information indicating the detailed information on each program, program information of each channel, and the like. Thereafter, the extracted channel information packet data and the extracted program information packet data are provided to the control block 116 (which will be described later) through a line L11 after passing through processes, such as conversion into an intermediate frequency, demodulation, error correction and the like.

At this time, the channel information packet data and the program information packet data provided to the control block 116 through the line L11 are used to tune a specific channel when the specific channel is selected by the user, thus allowing the control block 116 to generate a tuning control signal. Further, the channel information packet data and the program information packet data are used as the contents of a menu screen when the display of a plurality of pieces of channel information and the program information of each channel is requested by the user.

The demultiplexer 104 selects broadcast signals of one cable broadcasting station among demodulated broadcast signals of a plurality of cable broadcasting stations provided from the tuner and the demodulation block 102, on the basis of the tuning control signal provided from the control block 116 through a line L12, and then transmits the selected broadcast signals to the MPEG decoding block 106.

Meanwhile, the MPEG decoding block 106 restores the selected broadcast signals, i.e., compression-coded audio and video signals (the audio and video signals compression-coded in view of time and space correlation), which are provided from the demultiplexer 104, into original signals by adopting decoding techniques, such as variable-length decoding, inverse Discrete Cosine Transform (DCT), inverse quantization, motion compensation and the like, based on a decoding control signal provided by the control block 116 through a line L13. The restored digital video and audio signals are provided to the encoding block 108.

Further, the encoding block 108 converts the digital video and audio signals, provided from the MPEG decoding block 106, into National Television System Committee (NTSC)— or Phase Alternation by Line system (PAL)—type analog video and audio signals on the basis of an encoding control signal provided from the control block 116 through a line L14, and then provides the analog video and audio signals to the output switching block 112 through the first switching unit 110.

Meanwhile, the control block 116, which includes, for example, a microprocessor for controlling the entire operation of the system, etc., generates a tuning control signal corresponding to the channel information packet data and the program information packet data when the channel information packet data and the program information packet data are inputted thereto, and then provides the tuning control signal to the tuner and demodulation block 102 and the demultiplexer 104 through the lines L11 and L12, respectively. Further, the control block 116 sequentially stores the channel information packet data and the program information packet data for each channel in a predetermined area of the memory block 118.

Furthermore, when a service request signal for a program guide menu is inputted to the control block 116 from the outside, the control block 116 retrieves the channel information packet data and the program information packet data for each channel which have been stored in the predetermined area of the memory block 118, and then provides the channel information packet data and program information packet data to the menu generation block 120 through a line L16.

Further, when a user manipulation signal for recording the broadcast signals on a videotape or playing a program recorded on the videotape is inputted to the control block 116, the control block 116 generates a recording or playback control signal corresponding to the user manipulation signal, and then transmits the recording or playback control signal to the VCR control block 122 through a line L17.

In the meantime, when the service request signal for the program guide menu is inputted, the menu generation block 120 constructs the channel information packet data and the program information packet data for each channel, which are provided from the control block 116 through the line L16, into menu screen data using graphics, and then converts the constructed menu screen data into NTSC or PAL analog signals, and then provides the NTSC or PAL analog signals to the output switching block 112.

Therefore, when the service request signal for the program guide menu is not inputted, the output switching block 112 transmits the analog video and audio signals provided from the encoding block 108 to a display unit and a speaker via the second switching unit 114, and, in case of recording mode, transmits the analog video and audio signals to the VCR control block 122 through a line L19. However, when the service request signal for the program guide menu is inputted, a recording operation is not performed through the line L19, but the video signals transmitted to the display unit are displayed in the form of composite screen data, i.e., the combination of the menu screen data, provided from the menu generation block 120, and the video signals.

The first switching unit 110 is a device for selectively connecting or disconnecting a variable contact point b1 to or from a fixed contact point a1 in response to a first or a third switching control signals, respectively, which are provided from the control block 116 through the line L15. The second switching unit 114 is a device for selectively disconnecting or connecting a variable contact point b2 from or to a fixed contact point a2 in response to a second or a fourth switching control signals, respectively, which are provided from the control block 116 through a line L18. When a GUI is activated in response to the service request signal for the program guide menu during the simultaneous execution of watching and recording mode, the first and second switching control signals are generated by the control block 116. The variable contact point b1 is connected to the fixed contact point a1 in response to the first switching control signal, and the variable contact point b2 is disconnected from the fixed contact point a2 in response to the second switching control signal. However, when the GUI is not activated, the third and fourth switching control signals are generated by the control block 116. The variable contact point b1 is disconnected from the fixed contact point a1 in response to the third switching control signal, and the variable contact point b2 is connected to the fixed contact point a2 in response to the fourth switching control signal. Herein, relay switches and the like can be used for the first and second switching units 110, 114.

The VCR control block 122 includes, for example, a microprocessor, etc., to control the entire operation of the VCR. In case of a recording mode, the VCR control block 122 converts broadcast signals (analog video and audio signals) provided through the line L19 into signals recordable on a videotape and then transmits the recordable signals to the recording and playback block 124. Further, in case of a simultaneous watching and recording mode, when the GUI is activated, the VCR control block 122 converts broadcast signals (analog video and audio signals), provided through the first switching unit 110 (not through the second switching unit 114), into signals recordable on a videotape, and transmits the recordable signals to the recording and playback block 124. In case of a playback mode, the VCR control block 122 transmits playback signals provided from the recording and playback block 124 to an external output side, i.e., to the display unit and the speaker, through the line L19 and then the second switching unit 114, sequentially.

The recording and playback block 124, including a head drum, a deck for accommodating the videotape, etc., performs a function of amplifying the recordable signals, provided from the VCR control block 122, to certain levels and then recording the amplified signals on the videotape, in the recording mode, and a function of detecting the playback signals from the videotape and then transmitting the playback signals to the VCR control block 122 in the playback mode.

Next, a method for controlling the recording operation of the VCR in response to the GUI in accordance with the present invention will be described in detail.

FIG. 2 illustrates a flowchart of a process of recording a broadcasting program in accordance with the present invention.

Referring to FIG. 2, in the course of executing a watching and a recording operations by the VCR systems, i.e., when a cable broadcasting program is recorded on a videotape and, at the same time, broadcast signals are provided to the display unit and the speaker after passing through processes, such as demultiplexing, MPEG decoding, encoding and the like, the control block 116 checks whether a GUI is activated (steps 202, 204).

If the GUI is not activated, the control block 116 transmits the third switching control signal to the first switching unit 110 to disconnect the variable contact point b1 from the fixed contact point a1, and transmits the fourth switching control signal to the second switching unit 114 to connect the variable contact point b2 to the fixed contact point a2. Therefore, the broadcast signals (analog broadcast signals) are transmitted to the VCR control block 122 through the line L19 and then recorded on a videotape by the recording and playback block 124.

If the GUI is activated at step 204, the control block 116 retrieves data required to construct a menu screen from the memory block 118 and then transmits the retrieved data to the menu generation block 120 through the line L16, and at the same time, the control block 116 provides the first and second switching control signals to the first and second switching units 110, 114 through the lines L15 and L18, respectively. Therefore, the variable contact point b1 and the fixed contact point a1 of the first switching unit 110 are switched to be connected to each other, and the variable contact point b2 and the fixed contact point a2 of the second switching unit 114 are switched to be disconnected from each other (step 206). In this case, the VCR control block 122 controls the analog broadcast signals transmitted directly through the first switching unit 110 to be recorded on the videotape, and the composite screen data, i.e., the combination of the menu screen data, generated by the menu generation block 120, and the analog broadcast signals, are outputted to the external output side (the display unit and the speaker) (steps 208, 210). That is, the cable broadcasting program is recorded on the videotape without the menu screen data being combined therewith, while the composite screen data, i.e., combination of the menu screen data and the broadcast signals, are displayed on the display unit and the speaker.

The control block 116 repeatedly executes the above-mentioned control process, i.e., steps 206 to 210, whenever a GUI is activated (step 212). However, when the GUI is deactivated, the control block 116 transmits the third and fourth switching control signals to the first and second switching units 110, 114 through the lines L15 and L18, respectively, thereby disconnecting the variable contact point b1 from the fixed contact point a1 of the first switching unit 110 and connecting the variable contact point b2 to the fixed contact point a2 of the second switching unit 114 (step 214).

In accordance with the present invention, there is an advantage in that the control block 116 checks whether a GUI is activated in the course of watching and recording broadcasting program, and then performs an automatic switching operation so that the broadcast signals can be recorded before menu screen data are combined with the broadcast signals when the GUI is activated, unlike a conventional scheme which records the composite screen data in the course of watching and recording the broadcast signals. Therefore, the present invention basically prevents the menu screen data from being combined with the broadcast signals.

While the invention has been shown and described with respect to the preferred embodiment, it will be understood by those skilled in the art that various changes and modifications may be made without departing from the spirit and scope of the invention as defined in the following claims.

What is claimed is:

1. An apparatus for controlling a recording operation included in a Video Cassette Recorder (VCR), wherein a watching operation is executed through a monitor, and at the same time, the recording operation is executed through a recording unit with respect to a cable broadcasting program, comprising:

control means for checking whether a Graphical User Interface (GUI) is activated, and then generating a first and a second switching control signals when the GUI is activated, and generating a third and a fourth switching control signals when a GUI is not activated;

combining means for combining menu screen data generated from the GUI with broadcast signals of the cable broadcasting program to thereby generate composite signals when the GUI is activated, while transmitting the broadcast signals when the GUI is not activated;

first switching means for transmitting the broadcast signals to the combining means for the purpose of the watching operation, and at the same time, to the recording unit for the purpose of the recording operation, in response to the first switching control signal when the GUI is activated, while transmitting the broadcast signals to the combining means for the purpose of the recording and the watching operations in response to the third switching control signal when the GUI is not activated; and second switching means for transmitting the composite signals received from the combining means to the monitor for the purpose of the watching operation in response to the second switching control signal when the GUI is activated, while transmitting the broadcast signals to both the recording unit for the purpose of the recording operation and to the monitor for the purpose of the watching operation in response to the fourth switching control signal when the GUI is not activated.

2. The apparatus of claim 1, wherein the second switching means provides the broadcast signals from the recording unit to the monitor when the broadcast signals recorded by the recording unit are replayed.

3. The apparatus of claim 2, wherein the first and second switching means are relay switches.

4. A method for controlling a recording operation included in a Video Cassette Recorder (VCR), wherein a watching operation is executed through a monitor, and at the same time, the recording operation is executed through a recording unit with respect to a cable broadcasting program, comprising the steps of:

checking whether a Graphical User Interface (GUI) is activated; and displaying broadcast signals of the cable broadcasting program through the monitor and at the same time transmitting the broadcast signals to the recording unit so as to record the broadcast signal when the GUI is not activated, while transmitting the broadcast signals to the recording unit before the GUI is combined with the broadcast signals, and displaying composite signals, which is the combination of the GUI and the broadcast signals, on the monitor after the GUI is combined with the broadcast signals when the GUI is activated.

* * * * *